United States Patent [19]

Yamada et al.

[11] Patent Number: 5,071,084
[45] Date of Patent: Dec. 10, 1991

[54] REEL FOR MAGNETIC TAPE

[75] Inventors: Takuzi Yamada; Seizi Tsuyuki, both of Kanagawa, Japan

[73] Assignee: Fuji Photo Film Co., Ltd., Kanagawa, Japan

[21] Appl. No.: 459,404

[22] Filed: Dec. 29, 1989

[30] Foreign Application Priority Data

Dec. 29, 1988 [JP] Japan .......................... 63-171377[U]

[51] Int. Cl.$^5$ .................. G11B 15/32; G11B 23/04
[52] U.S. Cl. ............................... 242/71.8; 242/68.5
[58] Field of Search ............. 242/71.8, 68.6, 68.5, 242/118.8, 118.4, 71.9, 74; 360/132

[56] References Cited

U.S. PATENT DOCUMENTS

| | | |
|---|---|---|
| 1,924,977 | 8/1933 | Buhler ........................... 242/71.8 |
| 4,289,282 | 9/1981 | Kohno ............................ 242/71.8 |
| 4,403,749 | 9/1983 | Nakagawa ....................... 242/71.8 |
| 4,420,128 | 12/1983 | Okamura et al. .............. 242/71.8 X |
| 4,473,198 | 9/1984 | Pertzsch et al. ............... 242/197 |
| 4,606,511 | 8/1986 | Machida ......................... 242/71.8 |
| 4,625,252 | 11/1986 | Balz et al. ..................... 242/199 X |
| 4,664,328 | 5/1987 | Yamada ......................... 242/71.8 |

FOREIGN PATENT DOCUMENTS 25826  2/1980 Japan .................................. 242/71.8

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A magnetic tape reel in which transformation of the tape winding surface owing to the heat shrinkage after molding is suppressed, and also transformation of the hub hole owing to the winding tension of the magnetic tape is suppressed. At least a tape winding drum portion is provided with concentric cylindrical portions including an inner cylindrical portion having a hub hole to be engaged with a rotary driving shaft, an intermediate cylindrical portion provided concentrically with and outside the inner cylindrical portion, and an outer cylindrical portion provided concentrically with and further outside the intermediate cylindrical portion so as to form a tape winding surface. The intermediate cylindrical portion and the outer cylindrical portion are connected to each other through a plurality of reinforcing ribs which extend in the radial directions of the reel but which are not present between the inner cylindrical portion and the intermediate cylindrical portion.

4 Claims, 2 Drawing Sheets

REEL FOR MAGNETIC TAPE

BACKGROUND OF THE INVENTION

The present invention relates to a magnetic tape cassette, and more particularly to a magnetic tape reel used in a magnetic tape cassette for use in a VTR or the like.

Although they are classified into various types such as the type and VHS type, etc., magnetic tape cassettes for use in VTRs (video tape recorders) are generally similar to each other in basic structure, namely, the magnetic tape is housed in a cassette wound around a pair of magnetic tape reels. As shown in FIGS. 4 and 5, the reel structure includes a tape winding drum portion 2 provided with a plurality of concentric cylindrical portions including an inner cylindrical portion 6 engaged with a rotary driving shaft 30, an outer cylindrical portion 3 disposed outside the inner cylindrical portion 6 so as to form a tape winding surface 3, and, if necessary, an intermediate cylindrical portion disposed between the outer cylindrical portion 3 and the inner cylindrical portion 6. Also, a plurality of reinforcing ribs 15 are provided extending in the radial directions of the reel between the inner cylindrical portion 6 and the outer cylindrical portion 3, and flanges 8 and 9 are provided on the tape winding drum portion 2 at its lower and upper sides for causing the magnetic tape to be wound evenly and neatly. The reinforcing ribs 15 are provided in the radial directions of the reel for the purposes of improving the mechanical strength of the tape winding drum portion 2 and improving the resin flow when a reel 20 is injection molded with molten plastic resin.

Conventionally, there has been a problem in that portions of the reinforcing ribs 15 shrink in the radial directions of the reel because of the unavoidable shrinkage of the resin just after molding, whereby that the roundness or cylindricity of the tape winding drum portion 2 is disturbed.

In order to eliminate this problem, various proposals have been made. For example, in Japanese Examined Utility Model Publication No. 57-28313, a magnetic tape winding core is constituted by an inner cylindrical body having reinforcing ribs connected to the inner circumferential surface thereof, and an outer cylindrical body provided around the inner cylindrical body with a gap therebetween. In the configuration disclosed in the Japanese Utility Model Publication No. 57-28313, however, the problem remains in the case of a resin such as polyoxymethylene (POM) or the like which is widely used for molding reels, because the resin has a large thermal shrinkage characteristic. The configuration is generally effective though in the case of a resin such as ABS resin which undergoes relatively little shrinkage due to the reduction in temperature following injection molding.

In order to solve the this problem, the inventors have proposed a further improved reel structure in Japanese Unexamined Utility Model Publication No. 61-79886. According to this structure, the roundness and cylindricity of the tape winding drum portion have been remarkably improved.

However, the inventors have found a new problem through still further investigation and development. The problem is that, depending on the conditions of use and storage of a cassette, the reinforcing ribs 15 are sometimes urged in the inward radial directions of the reel by the winding and fastening pressure of the magnetic tape wound around the tape winding drum portion 2. Thus, a transformation sometimes occurs which reduces the diameter of hub holes 7 engaged with the rotary driving shaft 30 of the recording/reproducing apparatus. If such a transformation occurs while the cassette is in storage, it may become impossible for the hub hole 7 to engage with the rotary driving shaft 30. Further, if such a transformation occurs when the cassette is loaded in a recording/reproducing apparatus, it may become impossible to remove the cassette without damage.

SUMMARY OF THE INVENTION

The present invention has been attained in view of the problems described above, and an object thereof is to provide a magnetic tape reel in which transformation of the tape winding surface owing to the heat shrinkage after molding is suppressed, and also transformation of the hub hole owing to the winding tension of the magnetic tape is suppressed.

In order to attain the above and other objects of the present invention, the inventive magnetic tape reel around which a magnetic tape is to be wound is characterized in that the reel is configured such that at least a tape winding drum portion is provided with concentric cylindrical portions including an inner cylindrical portion having a hub hole to be engaged with a rotary driving shaft, an intermediate cylindrical portion provided concentrically with and outside the inner cylindrical portion, and an outer cylindrical portion provided concentrically with and further outside the intermediate cylindrical portion so as to form a tape winding surface. The intermediate cylindrical portion and the outer cylindrical portion are connected to each other through a plurality of reinforcing ribs which extend in the radial direction of the reel but which are not present between the inner cylindrical portion and the intermediate cylindrical portion.

DESCRIPTION OF THE PREFERRED EMBODIMENTS

Figure 1:
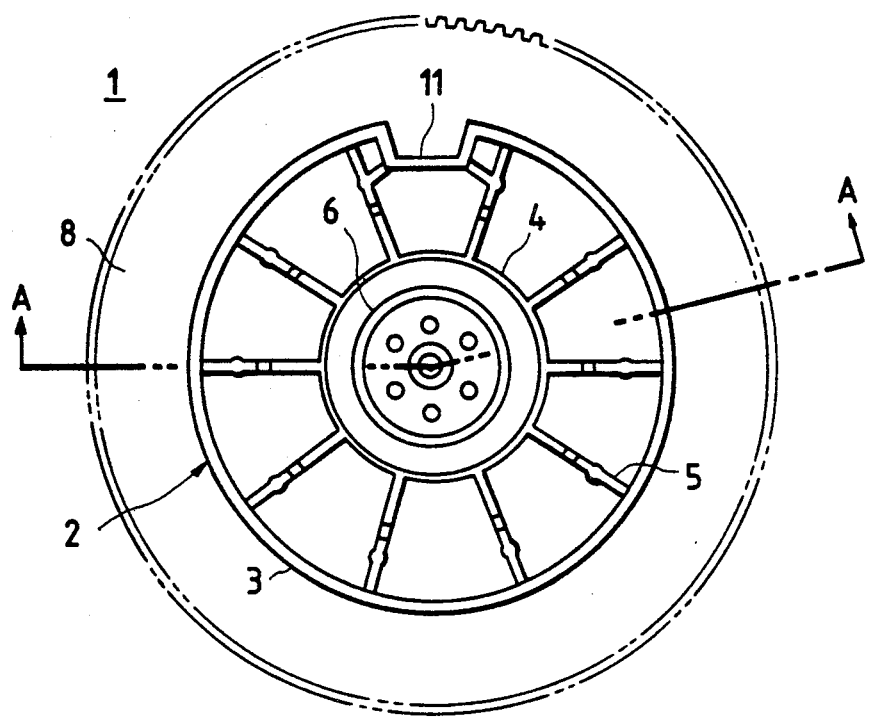
FIG. 1 is a plan view of a preferred embodiment of a magnetic tape reel according to the present invention.

A preferred embodiment of the present invention as illustrated by way of example in the drawings will be described hereunder.

Figure 2:
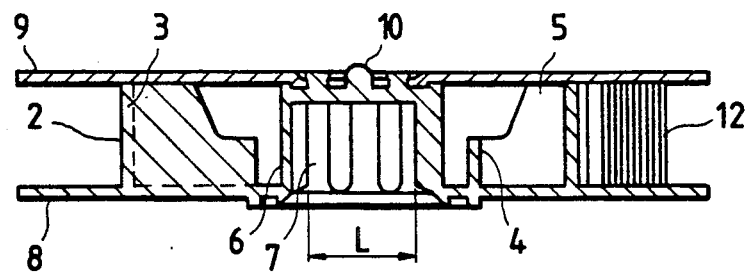
FIG. 2 is a vertical sectional view taken on a line A—A in FIG. 1.

FIG. 1 is a plan view of a reel for a magnetic tape cassette constructed according to the present invention, and FIG. 2 is a vertical sectional view taken on a line A—A in FIG. 1.

In a magnetic tape reel 1 of this embodiment, a tape winding drum portion 2 (core portion) is provided with a plurality of concentric cylindrical portions, including an inner cylindrical portion 6 having a hub hole 7 engageable with a rotary driving shaft 30 (see FIG. 5) of a recording/reproducing apparatus, an intermediate cylindrical portion 4 disposed concentrically with and suitably outside the inner cylindrical portion 6, and an outer cylindrical portion 3 disposed concentrically with and further outside the middle cylindrical portion 4 so as to form a tape winding surface. The intermediate cylindrical portion 4 and the outer cylindrical portion 3 are connected to each other through a plurality of reinforcing ribs 5 provided so as to extend in the radial directions of the reel. A lower flange 8 is formed integrally with the tape winding drum portion 2 at the upper end portion thereof, and an upper flange 9 formed separately from the tape winding drum portion 2 is provided on the tape winding drum portion 2 at the lower end portion thereof so as to cause the magnetic tape 12 to be neatly wound.

In accordance with the present invention, the reinforcing ribs 5 are not present between the inner cylindrical portion 6 and the intermediate cylindrical portion 4. With this configuration, the winding and fastening force of the magnetic tape 12 is transmitted to the intermediate cylindrical portion 4 through the reinforcing ribs 5. The winding and fastening force is received by the intermediate cylindrical portion 4 but it is not transmitted to the inner cylindrical portion 6. Accordingly, transformation of the inner cylindrical portion 6 owing to the tape winding and fastening force is prevented, and shrinkage of the diameter L of the hub hole 7 is made very small. As a result, it is possible to eliminate the disadvantage in the conventional cassette regarding the loading of a magnetic tape reel in a recording/reproducing apparatus.

Figure 3:
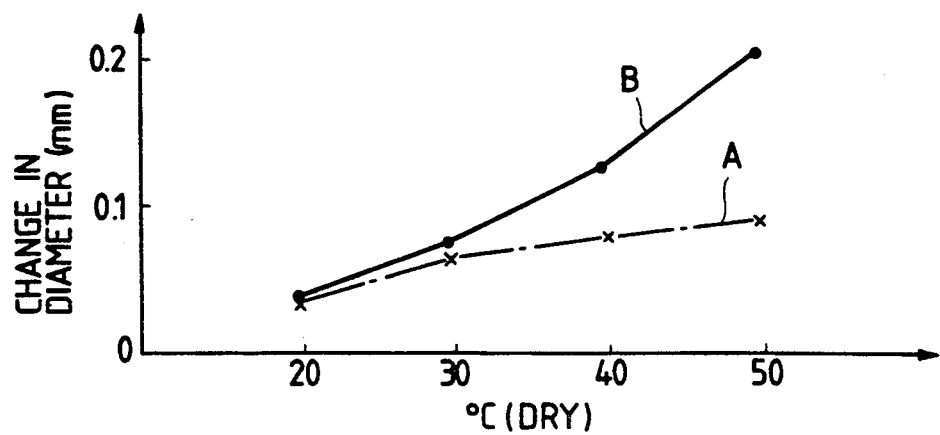
FIG. 3 is a graph showing the changes in diameter of the conventional hub hole and the hub hole according to the present invention by the winding and fastening force of the tape.
Figure 4:
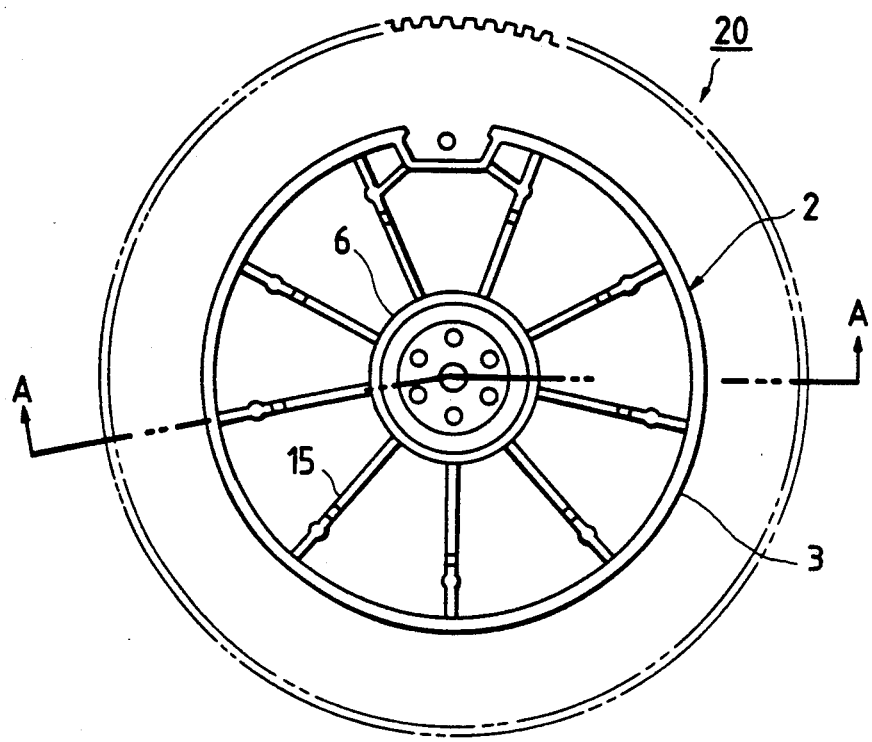
FIGS. 4 and 5 are a plan view and a vertical sectional view of a conventional magnetic tape reel respectively.
Figure 5:
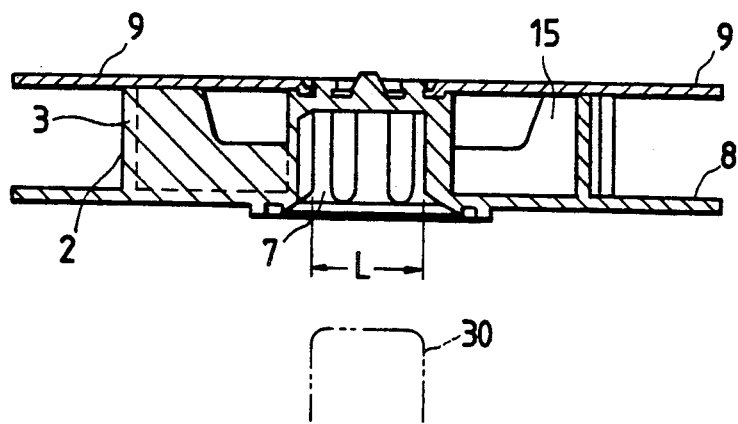

FIG. 3 shows the changes in shrinkage of the diameter L of the hub hole 7 caused by the winding and fastening of tape. The curve A in the graph of FIG. 3 shows the changes in the diameter in the case of using the reel of the embodiment shown in FIGS. 1 and 2, and the curve B shows the changes in the diameter of the hub hole 7 of a conventional reel as shown in FIGS. 4 and 5. In the experiment, the length of the magnetic tape wound on each of the reels 1 and 20 was 246 m, and after the reels 1 and 20 had been left in dry air for 48 hours at each of temperatures of 20° C., 30° C., 40° C. and 50° C., the amount of shrinkage of each tape was measured. From the results of these measurements, it is apparent that the reel 1 according to the present invention is not affected by the winding and fastening the tape.

Further, the inner cylindrical portion 6 is isolated from the reinforcing ribs 5 by the intermediate cylindrical portion 4 so that the inner cylindrical portion 6 is never affected by resin shrinkage due to the reduction of temperature of the reinforcing ribs 5 just after the reel 1 is taken out of a metal mold following injection molding.

With the provision of the reinforcing ribs 5, the reel can be produced without causing a significant reduction in resin flow during the molding of the reel, and the outer cylindrical portion 3 can be sufficiently strengthened by the combination structure of the reinforcing ribs 5 and the intermediate cylindrical portion 4. The whole of the reel can be therefore made thin.

For the material of the reel 1, conventionally used acrylonitrile-butadiene-styrene (ABS) resin, styrene-acrylonitrile (AS) resin, polypropylene (PP) resin, or the like may be used, or, alternatively, a plastic resin such as polyoxymethylene (POM) resin, or the like, which is good in abrasion resistance while relatively large in thermal shrinkage after molding, may be used.

Although one intermediate cylindrical portion 4 is provided in the above embodiment, the present invention is not limited to such a structure, and the reel may have a structure in which another intermediate cylindrical portion is formed between the intermediate cylindrical portion 4 and the outer cylindrical portion 3.

Although the above embodiment has been described with respect to a reel for a video tape cassette, it is a matter of course that the present invention is not limited to video tape cassettes and can be applied to reels for use in various kinds of magnetic tape cassettes.

As described above, the magnetic tape reel according to the present invention is configured such that a tape winding drum portion is provided with concentric cylindrical portions including an inner cylindrical portion having a hub hole to be engaged with a rotary driving shaft, an intermediate cylindrical portion provided concentrically with and outside the inner cylindrical portion, and an outer cylindrical portion provided concentrically with and further outside the intermediate cylindrical portion so as to form a tape winding surface, the intermediate cylindrical portion and the outer cylindrical portion being connected to each other through a plurality of reinforcing ribs provided so as to extend in the radial directions of the reel but not present between the inner cylindrical portion and the intermediate cylindrical portion. Accordingly, the reel can be produced without causing a reduction in resin flow in molding the reel, and the reel has a structure such that the inner cylindrical portion is isolated from the reinforcing ribs by the intermediate cylindrical portion. Thus, the inner cylindrical portion 6 is never affected by resin shrinkage due to the reduction of temperature of the reinforcing ribs 5 just after the reel 1 is taken out of a metal mold following injection molding. Further, the winding and fastening force of the magnetic tape is transmitted to the intermediate cylindrical portion through the reinforcing ribs but is not transmitted to the inner cylindrical portion. Accordingly, transformation of the inner cylindrical portion owing to the tape winding and fastening force is prevented, the conventional disadvantage in mounting the reel in a recording/reproducing apparatus is eliminated, the outer cylindrical portion can be sufficiently strengthened by the combination structure of the reinforcing ribs and the intermediate cylindrical portion, and the whole of the reel can be made thin so that the cost of materials can be reduced.

What is claimed is:

1. A magnetic tape reel around which a magnetic tape is to be wound, comprising:
   an inner cylindrical portion having a hub hole engageable with a rotary driving shaft;
   an intermediate continuously concentric cylindrical portion provided concentrically with and outside said inner cylindrical portion, wherein the entire outer diameter of said inner cylindrical portion and the entire inner diameter of said intermediate cylindrical portion are concentrically spaced and continuously parallel, said intermediate cylindrical portion having a first height;
   an outer cylindrical portion provided concentrically with and further oustside said intermediate cylindrical portion and forming a tape winding surface, said outer cylindrical portion having a second height, said first height being lower than said second height;
   a plurality of reinforcing ribs extending in radial directions of said reel solely between and connecting only said intermediate cylindrical portion and said outer cylindrical portion, and an open continuous space between said inner cylindrical portion and said intermediate cylindrical portion whereby a winding and fastening force of the magnetic tape is not transmitted to said inner cylindrical portion.

2. The magnetic tape reel of claim 1, further comprising a pair of tape winding flanges, one of said flanges being integral with said cylindrical portions on one side thereof in an axial direction, and the other of said flanges being coupled to said cylindrical portions on the other side thereof in an axial direction.

3. The magnetic tape reel of claim 1, wherein said tape reel is made of polyoxymethylene resin.

4. The magnetic tape reel of claim 1, wherein said tape reel is made of a material selected from the group consisting of acrylonitrile-butadiene-styrene resin, styrene- acrylonitrile resin, and polypropylene resin.

* * * * *